(No Model.)

G. THOMASON.
STEAM COOKER.

No. 439,027. Patented Oct. 21, 1890.

Witnesses:
Ed. E. Clement

Inventor:
Gustave Thomason
by Fitzgerald & Co
Attorneys.

UNITED STATES PATENT OFFICE.

GUSTAVE THOMASON, OF CLIFTON, TEXAS.

STEAM-COOKER.

SPECIFICATION forming part of Letters Patent No. 439,027, dated October 21, 1890.

Application filed June 12, 1890. Serial No. 355,146. (No model.)

*To all whom it may concern:*

Be it known that I, GUSTAVE THOMASON, a citizen of the United States, residing at Clifton, in the county of Bosque and State of Texas, have invented certain new and useful Improvements in Steam-Cookers; and I do hereby declare the following to be a full, clear, and exact description of the invention, such as will enable others skilled in the art to which it appertains to make and use the same.

My invention has relation to steam-cookers; and it consists in the construction and novel arrangements of parts, as hereinafter more fully described, illustrated in the accompanying drawings, and pointed out in the appended claims.

The objects of my invention are to provide a simple and inexpensive device for cooking or steaming vegetables and other kinds of food, and to provide the device with a removable interior perforated cylinder and a removable circular perforated disk carried by a rod which passes upward through the handle and provided at its outer end with a T-shaped head, and to provide the device with a tapering reservoir, the object of which is to remove the articles from the steamer after they have been cooked, as will be hereinafter more fully set set forth.

Figure 1:
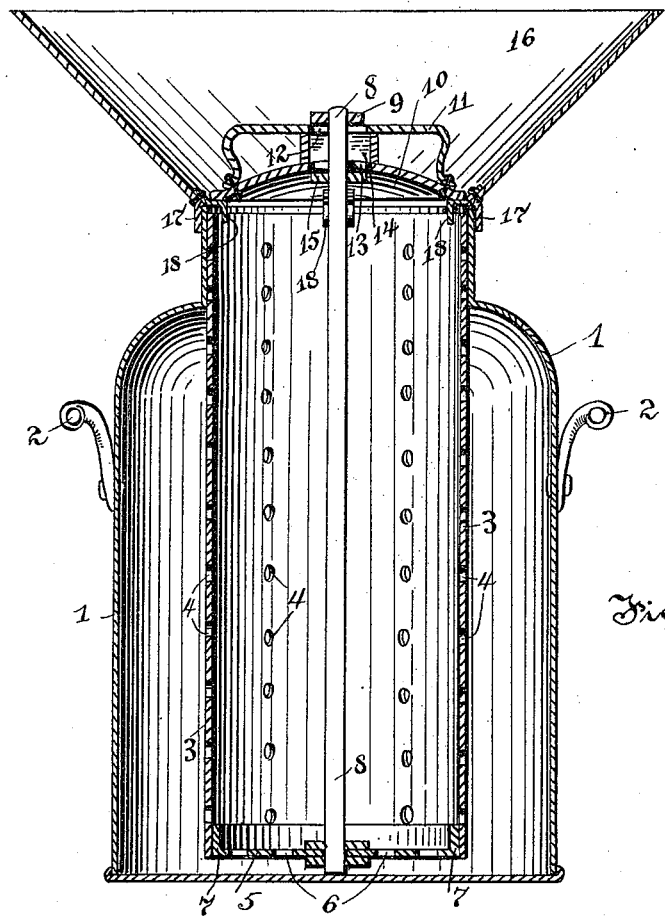
Figure 2:
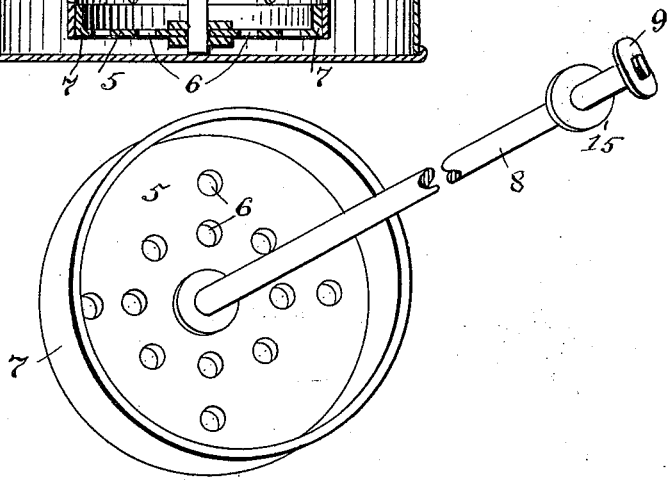

In the drawings, Figure 1 is a vertical section of a steamer embodying my improvements; Fig. 2, a detail view of the circular disk.

Referring to the accompanying drawings, in which like numerals indicate corresponding parts, 1 designates the outer or water-holding receptacle, which is of any convenient form and provided with suitable handles 2. Within the water-receptacle is placed a cylinder 3, open at both ends and provided with perforations 4, as shown. The diameter of the cylinder is regular and of a size corresponding with the interior diameter of the mouth of the water-receptacle.

For readily removing the articles from the steamer after they have been cooked, as well as to lower them into the steamer, I provide a circular disk 5, having formed in it a series of perforations 6 and provided at its outer edge with a vertical annular flange 7. Rising from the circular disk at its central part is a vertical rod 8, provided with a T-shaped head 9.

10 indicates the top of the water-holding receptacle, provided with a handle 11.

In order that the rod 8 may pass through the top and handle I provide said parts with longitudinal slots 12 and 13, and form between the top and handle a pipe or casing 14. At a suitable point on the rod 8 near its upper end is formed a circular offset 15, adapted to bear against the under face of the lid or top, as shown.

16 designates a reservoir, which is of general tapering form, as shown, open at both ends and having at its lower edge an annular vertical flange 17, adapted to fit on the outside of the water-receptacle at its upper end. To hold the reservoir in place, as well as to remove it from the water-receptacle when desired, after an article has been cooked, as will be presently explained, I provide said reservoir upon its inner face at the junction of the flange with inwardly and downwardly extending lugs 18.

Having thus described my invention, the operation of the same, taken in connection with the accompanying drawings, may be briefly described, as follows: The circular disk having been placed within the cylinder, a sufficient quantity of water is then put in the water-receptacle and the article to be cooked is next placed within the cylinder and allowed to rest upon the circular disk. The reservoir 16 is then placed in position upon the water-receptable and the lid or cover secured in place by the T-shaped head on the rod 8. After the article has been cooked the lid is removed, and by lifting on the rod the article can be withdrawn from the cylinder and into the reservoir. The flange 7 on the circular disk will then engage with the lugs 18 on the reservoir, and by continuing to lift on the rod cause the flange 17 to become disengaged from the water-receptacle. The article can then be thoroughly drained, the circular perforated disk forming the bottom for the reservoir.

I do not desire to confine myself to the precise construction herein shown and described, as many changes may be made without departing from the spirit of my invention.

What I claim, and desire to secure by Letters Patent, is—

1. In a steam-cooker, a water-holder provided with a slotted cover, an open-ended foraminous cylinder fitting within said water-holder, and a circular foraminous disk fitting within said cylinder, said disk being provided with an upwardly-extending axial rod with T-shaped head adapted to engage the slotted water-holder cover, all in combination, as and for the purpose intended, substantially as described.

2. In a steam-cooker, the combination of a water-holder with slotted cover, an open-ended foraminous cylinder fitting therein, and a circular foraminous disk fitting within said cylinder, said disk provided with an upturned circumferential flange, and an upwardly-extending axial rod with T-shaped head adapted to pass through and engage with the slotted water-holder cover, as and for the purpose intended, substantially as described.

3. In a steam-cooker, a water-holder, a superimposed funnel-shaped reservoir provided with a dependent flange engaging the mouth of the water-holder, and lugs dependent from said flange, in combination with a foraminous cylinder fitting within the water-holder and a circular disk contained therein having a raised rim or flange, said rim adapted when the disk is lifted to engage the lugs on the reservoir, as and for the purpose intended, substantially as described.

4. In a steam-cooker, the combination, with a water-holder and a funnel-shaped reservoir provided with dependent lugs superimposed thereon, of an open-ended foraminous cylinder fitting within said water-holder, a circular foraminous disk fitting within said cylinder, said disk having a raised rim or flange adapted when the disk is lifted to engage the lugs on the reservoir, and a cover for said water-holder, with means for securing said cover within the reservoir, substantially as described.

In testimony whereof I affix my signature in presence of two witnesses.

GUSTAVE THOMASON.

Witnesses:
N. JACOB NELSON,
M. EVENSON.